April 5, 1927.
O. WITTEL
1,623,514
PHOTOGRAPHIC FILM AND REEL THEREFOR
Filed June 20, 1925
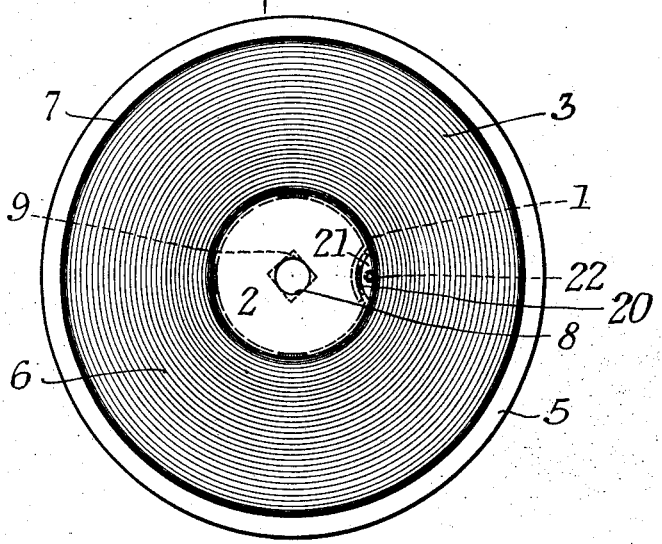
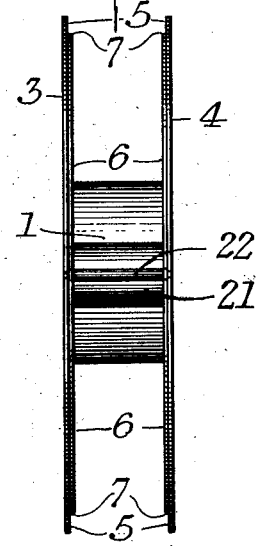
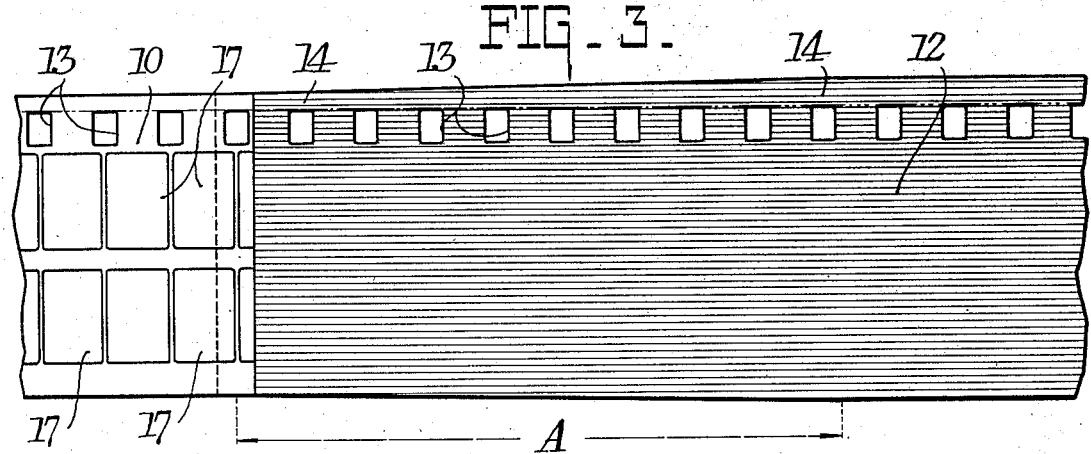
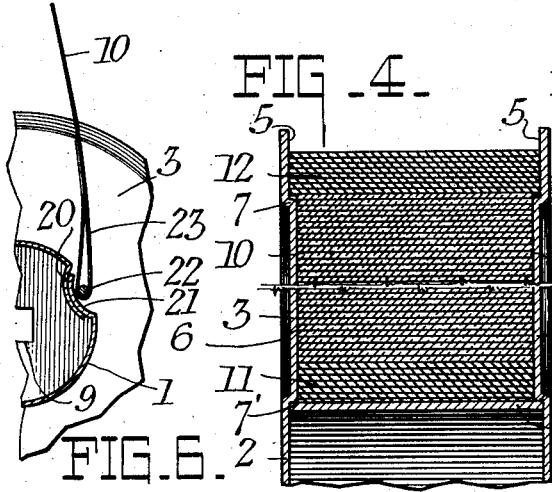
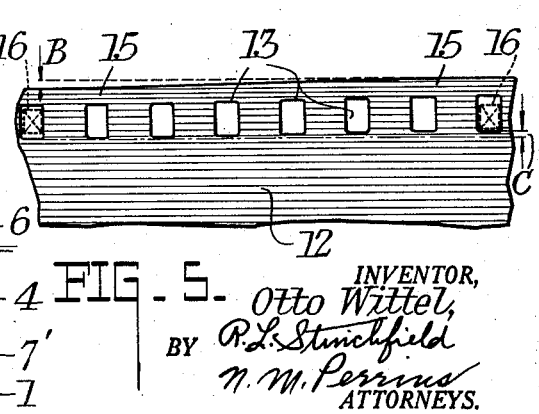
INVENTOR,
Otto Wittel,
BY R. L. Stinchfield
N. M. Perrins
ATTORNEYS.

Patented Apr. 5, 1927.

1,623,514

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC FILM AND REEL THEREFOR.

Application filed June 20, 1925. Serial No. 38,497.

This invention relates to reels and films for photographic work and more particularly to a reel upon which is wound a strip of motion picture film, and a lead strip therefor, the reel and strips being especially adapted for the prevention of light fog.

My invention is particularly applicable to film designed for use with a known type of motion picture apparatus, examples of which are found in United States Patent to Rosenberg, 691,493, granted Jan. 21, 1902. In this type of apparatus the film is wound on a supply spool from which the film is drawn through the apparatus past an exposure gate whereat an area of about half the available width is exposed at a time, making a series of exposure areas longitudinally of the film. When the strip is nearly exhausted, the direction of movement of the film is reversed and the film is rewound on the original supply spool. At the same time the relation between the film and the exposure window is so changed that a second longitudinal series of areas beside the first is exposed. The film will thus carry two longitudinal series of exposure areas, one beside the other, one being a continuation of the other and reversely arranged.

Since a strip of sensitized film, when removed from the camera on the reel upon which it was originally wound, has the same end outermost, it is necessary to have a light protective strip upon that end only. It is possible, therefore, to make the lead strip substantially wider than the film and to design the reel with corresponding spaces between its flanges, so that the wider lead strip can form an effective light seal to the narrower inner space within which the film is wound. Special provision is also made to make the core light tight so that the inner end of the film cannot be fogged. My invention resides in structures for the purposes outlined and will be more definitely pointed out in the claims.

Reference will now be made to the accompanying drawing in which the same reference characters designate the same parts throughout and in which, Fig. 1 is a side view of an improved reel made in accordance with my invention.

Fig. 2 is an edge view thereof.

Fig. 3 is a view of a portion of film with a portion of lead strip attached thereto.

Fig. 4 is a section of a portion of a reel with film and lead strip wound thereon.

Fig. 5 is a fragmentary view of a portion of a lead strip having a modified arrangement of the perforations.

Fig. 6 is a fragmentary view showing one method of attachment of the end of the film strip.

The reel as here disclosed comprises a central cylindrical metallic core 1 and two similar side flanges 3 and 4. The space between the flanges is wider near the edges at 5 and near the axis at 2 than it is in the intermediate zone 6, there being definite shoulders 7 and 7' at the points where the space widens. This shoulder 7 is continuous, extending around the flange at a uniform distance from its periphery. One flange has a circular axial opening 8 and the other a square axial opening 9 for the purpose disclosed in the patent to Howell, 1,507,357, granted Sept. 2, 1924.

The core 1 fits snugly within the shoulder 7' thereby effectually light sealing the interior of the reel of film. This core is made of a strip of sheet metal bent into cylindrical form but with the ends of the sheet overlapping as shown at 20 so as to exclude light and bent inwardly from the periphery of the core to form a concavity 21 across which is a rod or pin 22 secured to the side flanges.

The strip to be wound on the reel, as here disclosed, consists of a long band of uniform width fitting, with necessary manufacturing tolerances, the narrower space 6. This long band comprises the sensitized film strip 10 and the inner end may be, for purposes of economy, a strip of paper or other inexpensive and unsensitized material 11. The extreme end of the strip may be slipped under pin 22 and the strip bent back and wound around the core, thus forming a bend that is sufficient to hold the strip in place on the core. In use the strip is not so completely unwound as to permit this to loosen in the camera, but a long enough strip 11 is provided so that, when the end of the sensitized strip 10 shall have reached the exposure gate of the camera, there will still be enough of the strip 11 on the core to provide a firm attachment.

The strip 11, if any is used, is not relied upon to exclude light and this strip may be of light transmitting material such as waste film strips or even be a continuation of the sensitized film itself. The preferred method of attachment of the strip is to slip the end under the cross bar 22 and, doubling it back, to place a drop of suitable cement on the end so that it will stick to the strip and form a loop 23 around the bar 22, as shown in Fig. 6. This will constitute a positive attachment which can be easily cut off in the darkroom when the film is to be developed.

The film 10 and end strip 11 are together of sufficient length to substantially fill the flanges up to the abutment 7. To the outer end of the film is attached a protective strip 12 of a width to fit, with the necessary tolerances, the space 5. At the end joining the film this is gradually tapered over an interval designated A in Fig. 3. As shown in this figure, the perforations 13 of the film and the strip 12 are of the same size and in alignment, the border 14 between the perforations and the edge increasing in width. If desired, however, the border may be of uniform width as at 15 in Fig. 5. In this figure, the perforations 13 of the strip are not in alignment. In using such a strip, it would be necessary if the center of the strip is to remain in the same alignment to employ sprocket teeth or pulldown claws narrower than the perforations and so situated that they would be seated toward one end of the perforations in the narrow portion of the strip and toward the other end of the perforations in the wider portion. The locations of such a tooth or claw are indicated at 16 in Fig. 5, in which figure the arrows and dotted lines indicate at B and C, the extent to which the edge of the strip and the line of the perforations depart from alignment with the center of the film along the tapering portion. In the forms shown, the perforations are along one border only of the film.

It is obvious that the wider protective strip and the abutments of the flanges together form an effectual light trap reducing greatly the probability of light fog from the periphery of the reel, while the overlapping shoulder and closed core prevent light entering from the open core. In manufacturing reels it is customary to spot weld the flanges and cores together or to use a riveted over tongue or some other connection that is not continuous, and which may permit light to pass. The prevention of edge fog is particularly important in motion picture film in small sizes adapted for home and amateur use where the unexposed margins are narrow and an amount of light fog that would be permissible on wider film would be very objectionable.

While the film may be of any desired size, it may be stated that the film chosen by way of example is 16 mm. in width and the end strip is 17 mm. in width, while the individual picture areas 17 are 5 mm. in their dimension transversely of the film.

It is to be understood that the above disclosure is by way of example and that I contemplate as included in my invention all such modifications and equivalents as fall within the scope of the appended claims.

Having thus described my invention, what I claim as new and desire to secure by Letters Patent is:

1. In combination, a reel having spaced flanges, there being an annular shoulder extending inward from each flange whereby the flanges near their periphery are spaced by a certain distance greater than the distance between the facing surfaces at the shoulders, and a strip of material at least part of which is light sensitive wound on said reel, that part of the strip which is wound outside of the shoulder being wider than the space between the shoulders, and that part of the strip that is wound inside of the shoulders being as narrow as the distance between the shoulders.

2. In combination, a reel having spaced flanges, there being an annular shoulder extending inward from each flange whereby the flanges near their periphery are spaced by a certain distance greater than the distance between the facing surfaces at the shoulder, and a strip of material at least part of which is light sensitive wound on said reel, that part of the strip which is wound outside of the shoulder being wider than the space between the shoulders, and that part of the strip that is wound inside of the shoulders being as narrow as the distance between the shoulders, the width of the material tapering from the portion of narrow width to the portion of greater width.

3. In combination, a reel having a core and spaced flanges, said flanges having near their peripheries and on their facing surfaces shoulders, the flanges being separated by a greater distance outside of said shoulders than they are at and within said shoulders, and a strip of material attached to said core and wound on said reel, a portion of said strip being sensitized and as narrow as the smaller distance between the flanges and wound within said shoulders, and the outer end portion of the strip being wider than the distance between the flanges at the shoulders and wound outside of the shoulders.

4. In combination, a reel having a core and spaced flanges, said flanges being separated by a definite distance at their peripheries and at a distance inwardly from said peripheries having shoulders on their facing surfaces, the distance between the shoulders being less than the distance between the peripheries, and a strip of material attached to said core and wound on said reel, that part of the material wound between the core and the shoulder, having a width as narrow as the distance between the shoulders, and at least a portion thereof being light sensitive, and that part of the material wound outside of the shoulders being wider than the distance between the shoulders.

5. A photographic sensitized film strip adapted to be wound on a reel and having at one end only a protective strip of greater width than the rest of the strip.

6. A band of strip material adapted to be wound on a reel and comprising a sensitized strip of uniform width, an unsensitized, strip at one end as narrow as the sensitized strip and a protective strip at the other end wider than the sensitized strip.

7. A photographic sensitized film strip adapted to be wound on a reel and of uniform width in its intermediate portion and having at one end a protective strip of greater width than the intermediate portion, the width varying gradually from the narrower to the wider portion.

8. In combination, a reel having a core and spaced flanges, the core being light tight and having a light tight connection with the flanges, and the flanges having near their peripheries and on their facing surfaces shoulders, the flanges being separated by a greater distance outside of said shoulders than they are at and within said shoulders, and a strip of material at least part of which is sensitive wound on said reel, that part of the strip which is wound outside of the shoulders being wider than the space between the shoulders, and that part of the strip that is wound inside of the shoulders being as narrow as the distance between the shoulders.

9. In combination, a reel having a core and spaced circular flanges, the flanges having annular portions near their peripheries and circular portions about their axes that are more widely separated than the intermediate annular portions, the core being light tight and fitting into the axial portions of the flanges to form a light tight connection therewith, and a strip of material at least a part of which is sensitive wound on said reel, that part of the strip that is wound in the peripheral portion being wider than the space between the intermediate portions and that part of the strip that is wound between the intermediate portions being no wider than the distance between such portions.

10. A reel for motion picture film comprising a core and two spaced flanges, the flanges having their facing annular peripheral portions and circular axial zones more widely spaced apart than the intermediate annular zone, the core being light tight and fitting into the axial zones of the flanges to form a light tight connection therewith.

Signed at Rochester, New York, this 16th day of June, 1925.

OTTO WITTEL.